Aug. 16, 1927.
L. M. SCOFIELD ET AL
1,639,469
FILM SUPPORT FOR MOTION PICTURE PROJECTING MACHINES
Filed July 31, 1924
2 Sheets-Sheet 1
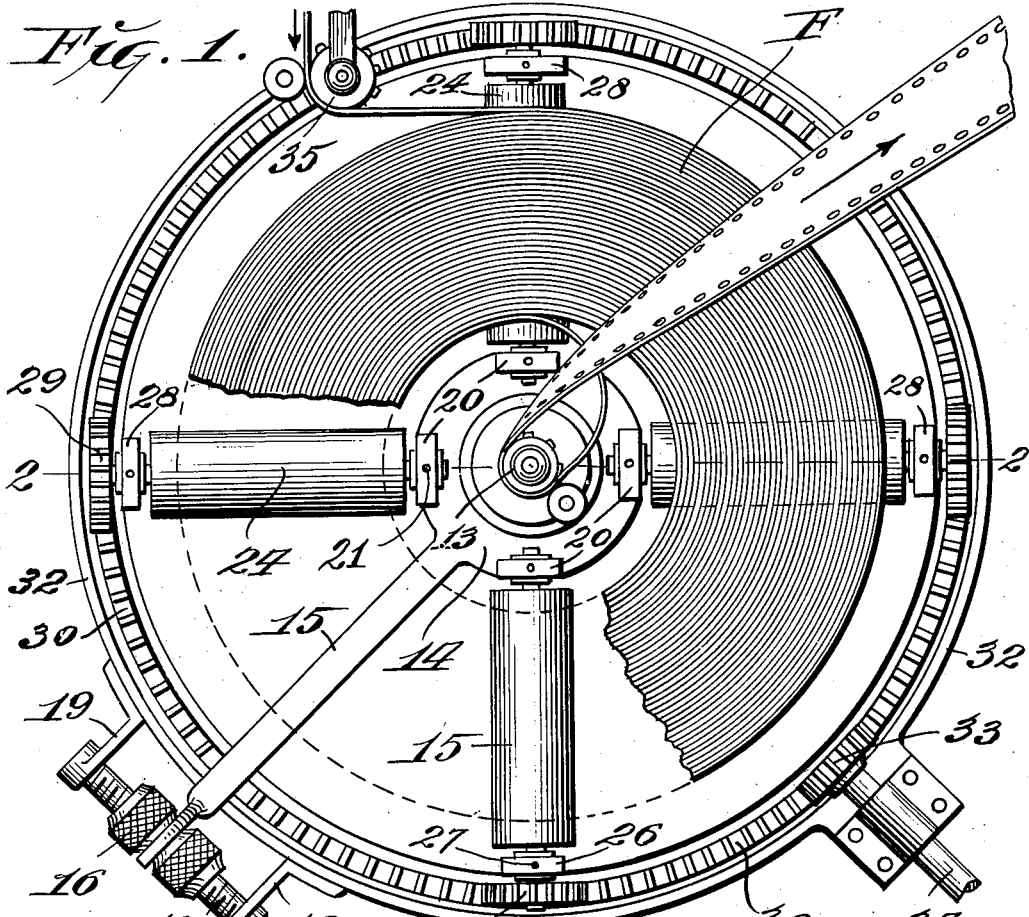
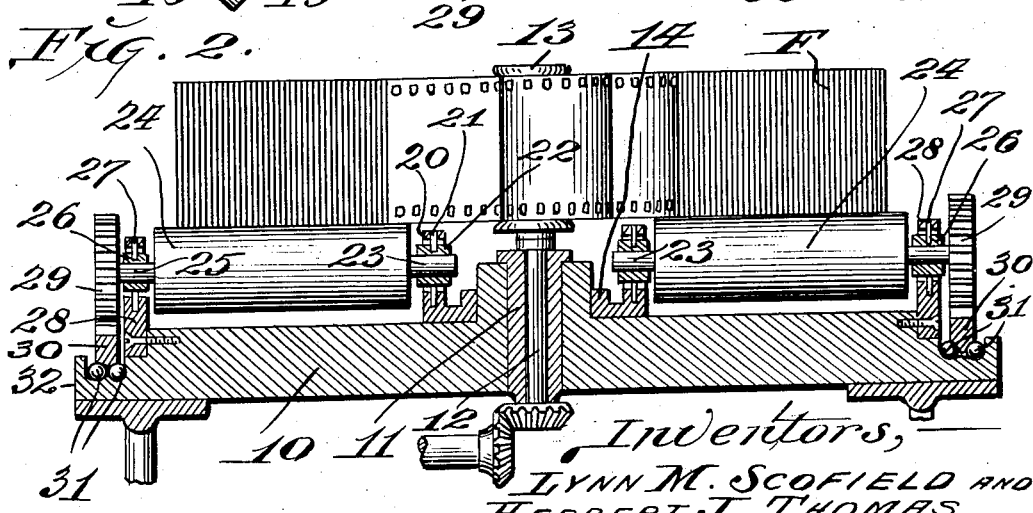
Inventors,
Lynn M. Scofield and
Herbert J. Thomas
By Martin P. Smith Atty.

Aug. 16, 1927.

L. M. SCOFIELD ET AL 1,639,469

FILM SUPPORT FOR MOTION PICTURE PROJECTING MACHINES

Filed July 31, 1924    2 Sheets-Sheet 2

INVENTORS:—
LYNN M. SCOFIELD AND
HERBERT J. THOMAS.
BY Martin P. Smith ATTY.

Patented Aug. 16, 1927.

1,639,469

UNITED STATES PATENT OFFICE.

LYNN M. SCOFIELD AND HERBERT J. THOMAS, OF LOS ANGELES, CALIFORNIA, ASSIGNORS TO HARRY S. MERRITT, OF LOS ANGELES, CALIFORNIA.

FILM SUPPORT FOR MOTION-PICTURE-PROJECTING MACHINES.

Application filed July 31, 1924. Serial No. 729,275.

Our invention relates generally to the motion picture projection art, and more particularly to a film support for motion picture projection machines that utilizes a continuous or endless film.

It will be understood that in certain fields of usefulness, for instance in advertising and for educational purposes, so-called continuous or endless films, which may be several hundred feet in length, are repeatedly run through the projecting machine, and it is the principal object of our invention to provide a relatively simple, practical and efficient support, for that portion or the body of the film that accumulates between the point where said film leaves the light opening and shutter of the machine and the point where said film again re-enters the machine. Obviously where a continuous or endless film is of considerable length, it is necessary to provide a convenient and compact support for that portion of the film that is outside of the projecting machine, and as the film enters and leaves the machine at the same speed it is necessary to move the supported body of the film at corresponding speed.

Where the body of the film is arranged in a coil, as, for instance, upon a reel or upon a revolving plate, the circumferential differences between the outer portion of the coil of film and the inner portion thereof causes a relative slipping movement between the layers of the film throughout the entire coil, and it is the purpose of our invention to provide means for supporting the body or coil of the film, which supporting means will act to permit all parts of the continuous or endless film to move at the same speed.

Further objects of our invention are to provide a film support of the character described that may be easily and cheaply produced, readily combined with practically all forms of motion picture projecting machines, and, further, to provide a film support that may be very accurately adjusted so as to operate to greatest advantage in conjunction with the driving mechanism of the projecting machine with which said supporting means is associated.

With the foregoing and other objects in view, our invention consists in the features of construction and combination and arrangement of parts hereinafter more fully described and claimed, reference being had to the accompanying drawings, in which Figure 1 is a top plan view of a continuous motion picture film supporting device of our improved construction;

Figure 2 is a cross section taken approximately on the line 2—2 of Figure 1;

Figure 3:
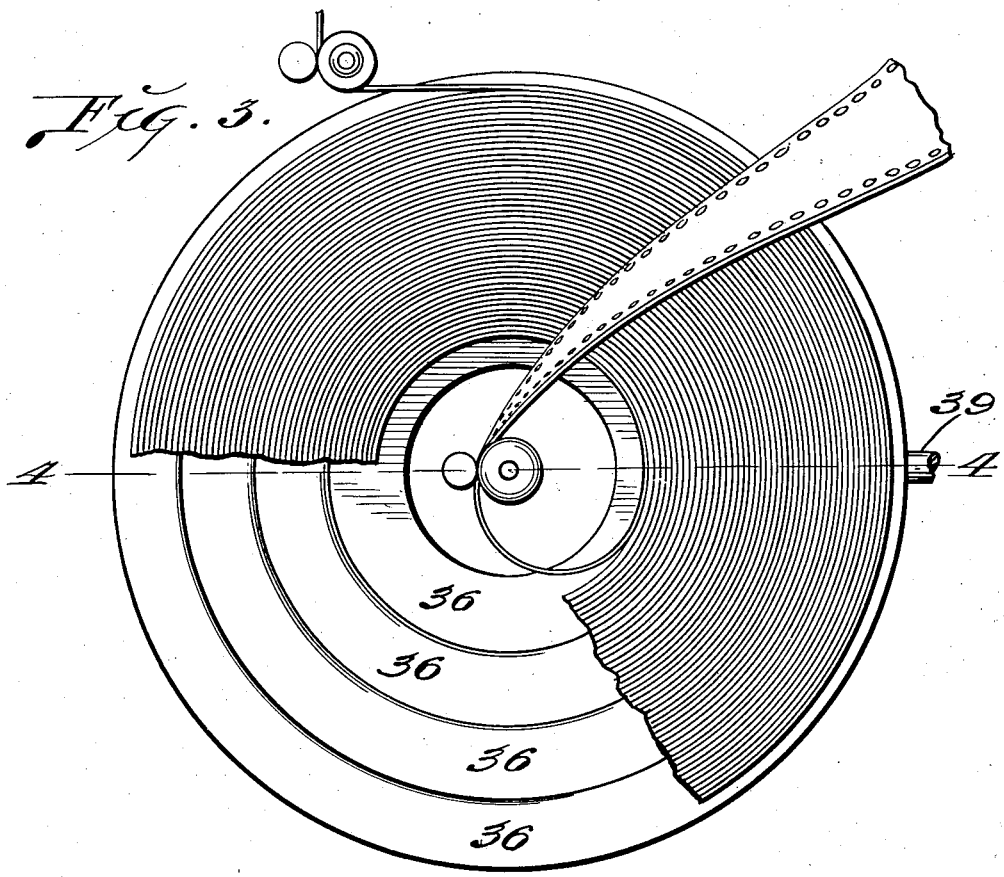
Figure 3 is a top plan view of a modified form of the film support.

Referring by numerals to the accompanying drawings, and particularly to the form of support illustrated in Figures 1 and 2, 10 designates a bed plate that is fixed on suitable supports, preferably at a point below and adjacent to the projection tube or housing of a motion picture projecting machine, and arranged in the center of said bed plate is a bearing 11 for a short vertically disposed shaft 12, the latter carrying on its upper end a sprocket wheel 13 around which the film is adapted to pass as it leaves the support.

Shaft 12 is driven in any suitable manner at the same speed and synchronously with the driving mechanism and sprockets that carry the film through the projecting machine past the light opening and shutter. Arranged on the upper face of bed plate 10 and disposed about the upper portion of bearing 11 is a ring 14 from which projects an arm 15, the outer portion of the latter extending beyond the edge of bed plate 10 and said projecting end being loosely engaged upon the center of a cylindrical nut 16. This nut is mounted on a short threaded rod 17, the latter being supported at its ends in suitable brackets 19 that project outwardly from the edge of bed plate 10.

Carried by and projecting upwardly from ring 14 is a series of blocks 20, each block being provided with an opening, and arranged within the latter and mounted upon vertically arranged pivot pins 21 that are seated in the block above and below each opening is a bearing 22. Journaled in the bearings 22 are the trunnions 23 that are formed on the inner ends of film supporting rollers 24, the latter being provided at their outer ends with trunnions 25 that are journaled in bearings 26. These last mentioned bearings are mounted to swing on vertically arranged pivot pins 27, the latter being seated in brackets 28 that project upwardly from bed plate 10 adjacent to its outer edge. The film supporting rollers 24 may be formed of any suitable material, for instance, a relatively soft metal, such as tin, zinc or composition, or they may be formed of hard rubber, compressed fiber or the like.

The trunnions 25 at the outer ends of the film supporting rollers project slightly beyond their bearings 26 and fixed on said projecting ends are pinions, such as 29, that mesh with a ring gear 30, the latter being supported by anti-friction bearings 31 upon a flange or ledge 32 that is formed on the outer portion of bed plate 10. This ring gear 30 may be driven in any suitable manner, but preferably by means of a pinion 33 that is carried by the end of a shaft 34, the latter being driven at the same speed and synchronously with shaft 12 and the driving mechanism and sprockets that carry the film past the projecting machine shutter and the light opening therein.

Where this form of film support is made use of, the coil of film F is supported by the rollers 24 and from the center of said coil the film passes around sprocket wheel 13 and thence upwardly through the projecting machine and from the latter downward around the suitably located sprocket wheel 35 and from thence onto the coiled body of film lying upon the supporting rollers. These rollers are simultaneously driven at the same speed through the engagement of the pinions 29 with the teeth of ring gear 30 and said ring gear is driven from shaft 34 through pinion 33. Thus the coiled body of film has a number of rolling supports and all portions of the supported film travel at the same speed.

Ordinarily the axes of the rollers 24 are radially arranged relative to the axis of shaft 12, but if desired these rollers may be simultaneously and correspondingly inclined slightly relative to radial lines by proper manipulation of the nut 16, for by rotating the latter upon the threaded rod 18 arm 15 may be swung in one direction or the other to slightly rotate ring 14 and, consequently, shift the position of the bearings 22 that receive the trunnions on the inner ends of said rollers.

By thus shifting the supporting rollers out of true radial positions, the film that rides upon said rollers may be caused to gradually travel inward toward the center of the coil and this action materially lessens the friction between the coils or convolutions of the film and produces a true and uniform feeding movement of the film from the outer layer of the coil to the inner layer thereof. By mounting the bearings 22 and 26 on vertically disposed axes, they will readily swing when the rollers are adjusted as just described and the degree of adjustment is so slight as not to interfere with the free operation of the pinions 29 with the teeth of ring gear 30.

In some instances, and particularly where a support is provided for films of considerable length, one or more idle rollers may be arranged between the driven rollers 24 and this arrangement will effectually prevent the body of film from tending to bend downwardly between the driving rollers.

Figure 4:
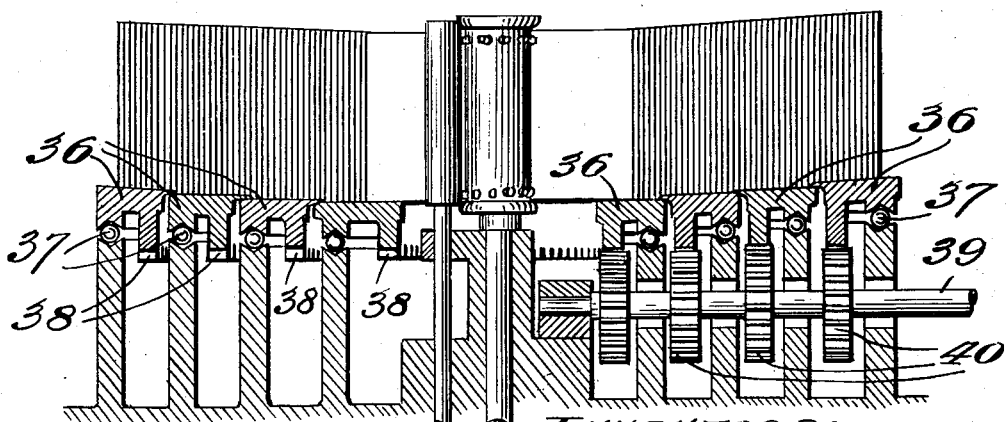
Figure 4 is a cross section taken on the line 4—4 of Figure 3.

In the modified construction illustrated in Figures 3 and 4, a series of concentric rings 36 are supported for independent rotation upon suitable anti-friction bearings 37 and formed on the under side of each ring is a circular row of gear teeth 38.

Arranged in suitable bearings beneath the rings 36 is a shaft 39 on which is mounted a series of pinions 40 that engage the teeth of the respective circular racks 38. By virtue of the arrangement just described, all of the rings are simultaneously driven at the same speed, and, consequently, all portions of the coil of film supported upon the rings will travel at the same speed and under all conditions the same amount of film will wind onto and unwind from the coil. In order that the film supported by the rotary table may feed readily from the outer portion of the coil to the inner portion thereof, we prefer to construct the rings so that the supporting surface is slightly concave and in order to do this the rings are formed so that in succession toward the outer or larger ring their upper surfaces are slightly higher than the next adjacent inner rings, and the inner edge of each ring overlaps to a slight degree the outer edge of the next adjacent ring.

Thus it will be seen that we have provided relatively simple and efficient means for supporting a coiled body of motion picture film, the supporting means being driven so as to move all portions of the supported film at the same speed. The film supporting mechanism is relatively simple in structure, capable of being easily and cheaply produced, may be readily combined with and driven from the ordinary and standard makes of motion picture projection machines, and provides a very convenient and efficient support for endless motion picture films.

It will be readily understood that various minor changes in the form, size and construction of our improved film support for motion picture projection machines without departing from the spirit of our invention, the scope of which is set forth in the appended claims.

We claim as our invention:

1. In a motion picture film support, a series of radially arranged film supporting rollers, pivoted bearings for said rollers and means for simultaneously moving the bearings at the inner ends of said rollers so as to change the angular positions of the axes of said rollers.

2. In a motion picture film support, a series of radially arranged film supporting rollers, pivoted bearings for said rollers, means for simultaneously moving the bearings at the inner ends of said rollers so as to change the angular positions of the axes of said rollers and means for driving said rollers.

3. In a motion picture film support, a series of radially arranged film supporting rollers, pivoted bearings for the outer ends of said rollers, a member mounted for rotary movement between the inner ends of said rollers and bearings for the inner ends of said rollers, which bearings are mounted on said rotatably arranged member.

4. In a motion picture film support, a series of radially arranged film supporting rollers, pivoted bearings for the outer ends of said rollers, a member mounted for rotary movement between the inner ends of said rollers, bearings for the inner ends of said rollers, which bearings are mounted on said rotatably arranged member and means for simultaneously driving all of said rollers at the same speed.

5. In a motion picture film support, a series of radially arranged film supporting rollers, pivoted bearings for the ends thereof and means for simultaneously and correspondingly shifting the bearings at the inner ends of said rollers whereby the angular positions of the rollers are changed.

6. In a motion picture film support, a series of radially arranged film supporting rollers, two sets of bearings for said rollers and a movable support upon which one set of the bearings for the rollers is pivotally mounted, whereby all of the pivotally mounted bearings may be simultaneously and correspondingly shifted so as to change the relative angular positions of the axes of the rollers.

7. In a motion picture film support, a series of radially arranged film supporting rollers, two sets of bearings for said rollers, a movable support upon which one set of the bearings for the rollers is pivotally mounted, whereby all of the pivotally mounted bearings may be simultaneously and correspondingly shifted so as to change the relative angular positions of the axes of the rollers, pinions carried by said rollers and a circular rack engaging said pinions for simultaneously driving the same.

In testimony whereof we affix our signatures.

LYNN M. SCOFIELD.
HERBERT J. THOMAS.